No. 707,947. Patented Aug. 26, 1902.
R. SMITH.
ANIMAL STALL.
(Application filed Dec. 2, 1901.)
(No Model.) 2 Sheets—Sheet 2.
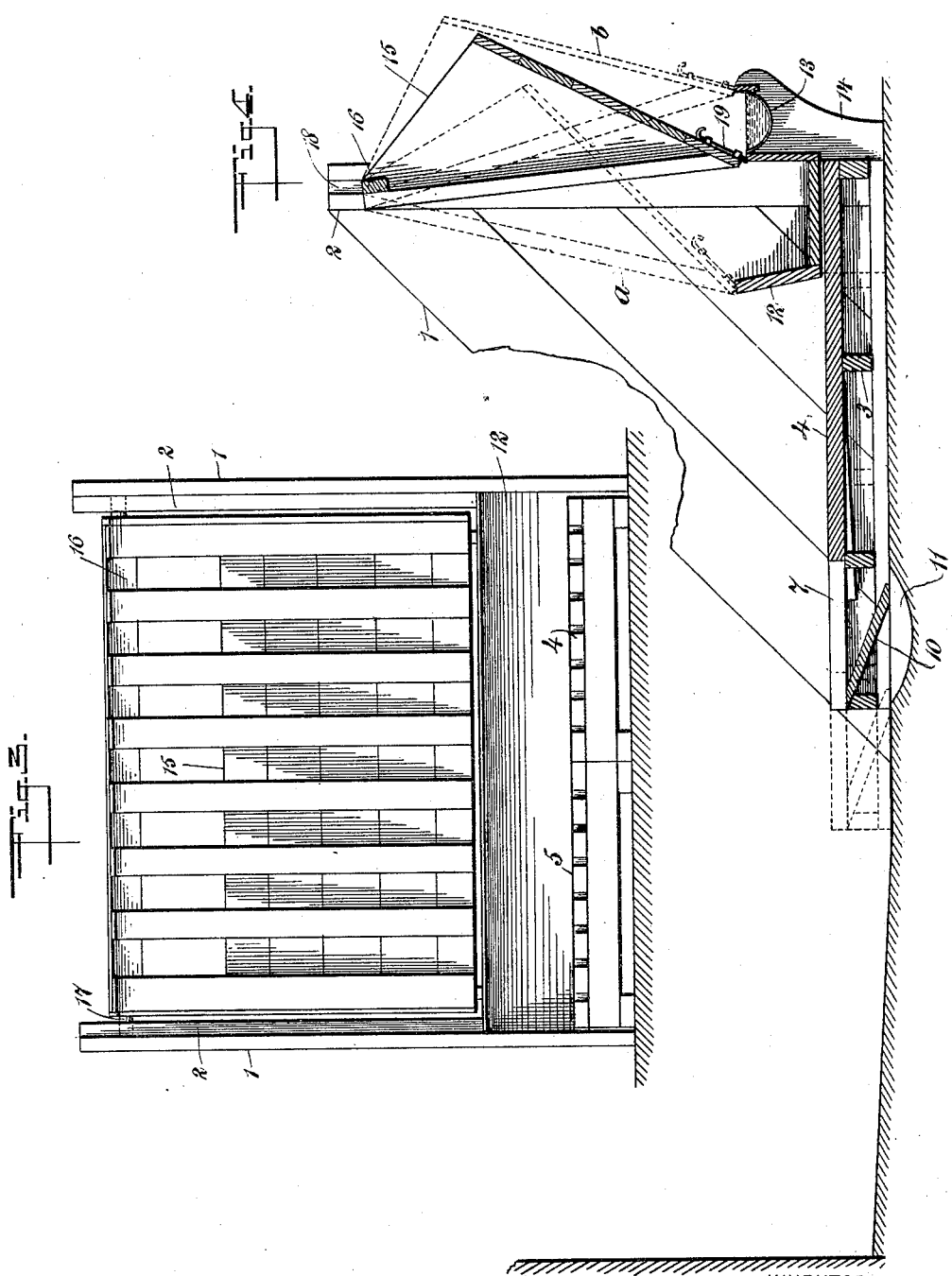
WITNESSES: INVENTOR
Richard Smith
BY
ATTORNEYS

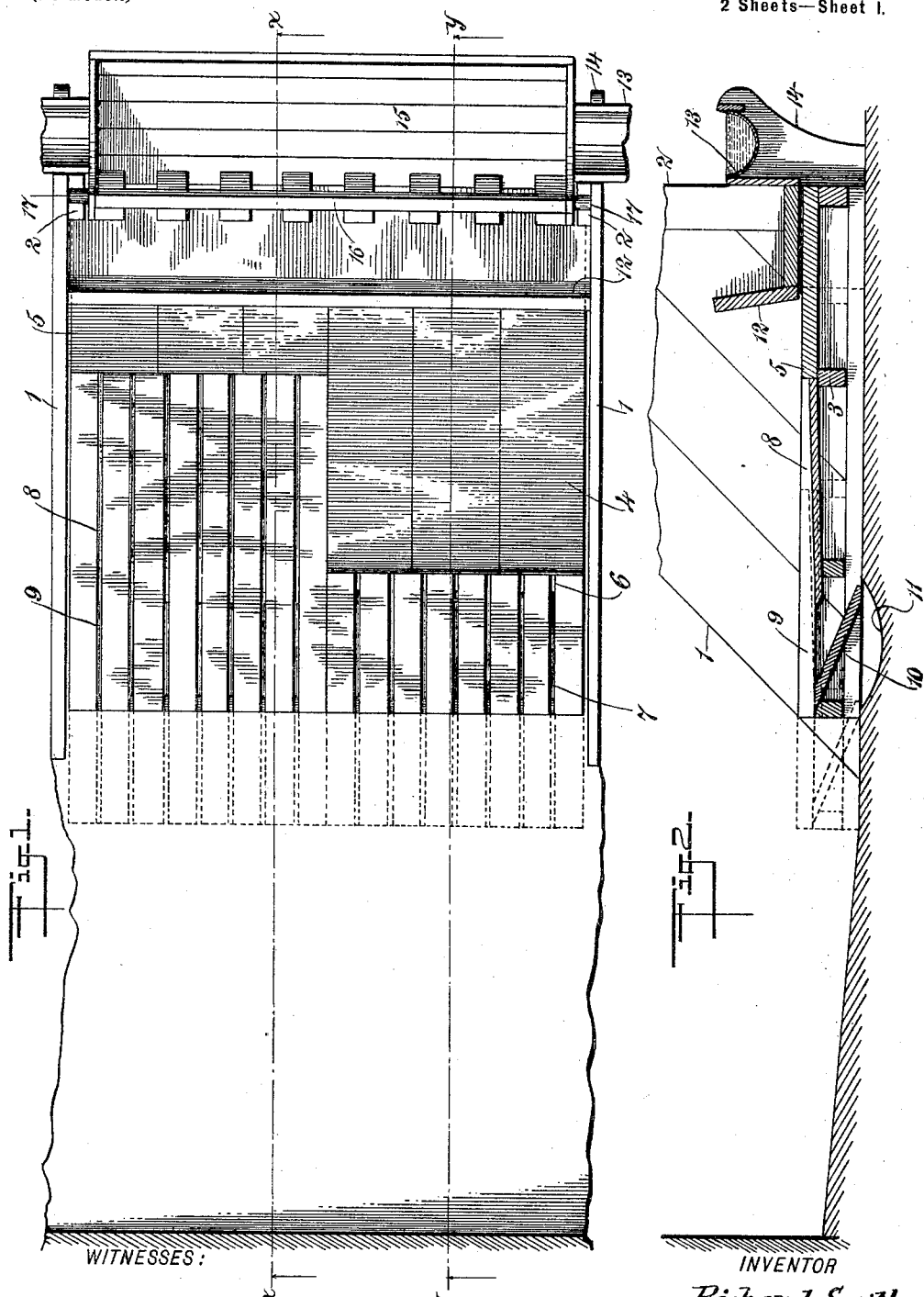

UNITED STATES PATENT OFFICE.

RICHARD SMITH, OF FORT WILLIAM, CANADA.

ANIMAL-STALL.

SPECIFICATION forming part of Letters Patent No. 707,947, dated August 26, 1902.

Application filed December 2, 1901. Serial No. 84,339. (No model.)

*To all whom it may concern:*

Be it known that I, RICHARD SMITH, a subject of the King of Great Britain, and a resident of Fort William, in the district of Thunder Bay, Province of Ontario, and Dominion of Canada, have invented a new and Improved Animal-Stall, of which the following is a full, clear, and exact description.

This invention relates to improvements in stalls for horses and cattle; and the object is to provide a stall of simple construction that may be easily kept clean, and having a movable floor whereby it may be adjusted for different-sized animals, and, further, to provide, in connection with the stall, a feed-rack, a feed-trough, and a water-trough, the feed-rack being mounted to swing so as to cut out the water-trough, or both the water-trough and feed-trough, whereby an attendant may place the feed and water from the head of the stall or without entering the stall.

I will describe an animal-stall embodying my invention and then point out the novel features in the appended claims.

Reference is to be had to the accompanying drawings, forming a part of this specification, in which similar characters of reference indicate corresponding parts in all the figures.

Figure 1 is a plan view of a stall embodying my invention. Fig. 2 is a section on the line $x$ $x$ of Fig. 1. Fig. 3 is an end elevation, and Fig. 4 is a section on the line $y$ $y$ of Fig. 1.

The stall shown is constructed to accommodate two animals, such as a horse and a mare or a steer and a cow. The stall comprises the sides 1, extended from the head uprights 2. Supported on rails 3 on the stable-floor are the stall-floor sections 4 5, the section 4 being intended for a female animal, while the section 5 is for a male animal. The section 4 at its rear portion is provided with channels 6, which terminate in openings 7, and the section 5 is provided with channels 8, extending nearly the entire length and terminating in openings 9. Underneath the openings are inclined deflector-boards 10, designed to direct liquid to a conduit 11, formed in the stable-floor, particularly when the floor-sections are drawn outward, as indicated by the dotted lines, to accommodate large animals.

Arranged at the inner or front end of the stall is a feed-trough 12, and extended across the front end of the stall or the several stalls is a water-trough 13, (here shown as supported by standards 14.) Mounted to swing on the uprights 2 is a holder 15 for hay or like food. The inner side of this holder is in the form of a rack, while the rear and ends are closed. The upper ends of the slats forming the rack are connected to a head-bar 16, having trunnions 17 at its ends, engaging removably in recesses 18 formed in the uprights and opening upward. When it is desired to place feed in the trough 12, a person at the front of the stall may swing the holder inward, as indicated by the dotted lines $a$, and hold it in such position by means of a bolt 19, carried by the holder, and engaging the bolt with the inner wall of the trough. When it is desired to water the stock, the holder is to be swung outward, as indicated by the dotted lines $b$, and held by the bolt. The position of the holder while the animal is feeding from the trough 12 is indicated in full lines in Fig. 4. When it is necessary to clean the stable-floor in the stall, the floor-sections may be wholly removed.

Having thus described my invention, I claim as new and desire to secure by Letters Patent—

1. In a stall, a floor-section having channels in its upper surface, extending lengthwise of the stall, and openings in which the channels terminate, and an inclined deflector secured to the rear end of the floor-section and extending forwardly under said openings, substantially as specified.

2. A stall constructed to receive two animals and provided with two slidable floor-sections each having channels terminating in openings at their rear ends, the channels of one section extending nearly the length of the section, and the channels of the other extending about one-fourth the length of the same, and inclined deflectors secured to the sections under the said openings, as set forth.

In testimony whereof I have signed my name to this specification in the presence of two subscribing witnesses.

RICHARD SMITH.

Witnesses:
W. P. STAUSER,
W. L. MORTON.